US011474962B2

(12) United States Patent
Spiegel (10) Patent No.: US 11,474,962 B2
(45) Date of Patent: Oct. 18, 2022

(54) METHOD FOR INITIALIZING A BUS SYSTEM FOR A PROCESS PLANT, AND THE BUS SYSTEM

(71) Applicant: KROHNE Messtechnik GmbH, Duisburg (DE)

(72) Inventor: Christoph Spiegel, Oberhausen (DE)

(73) Assignee: KROHNE Messtechnik GmbH, Duisburg (DE)

( * ) Notice: Subject to any disclaimer, the term of this patent is extended or adjusted under 35 U.S.C. 154(b) by 0 days.

(21) Appl. No.: 17/103,448

(22) Filed: Nov. 24, 2020

(65) Prior Publication Data

US 2021/0157755 A1 May 27, 2021

(30) Foreign Application Priority Data

Nov. 25, 2019 (DE) ...................... 10 2019 131 773.8

(51) Int. Cl.
*G06F 13/36* (2006.01)
*G06F 9/4401* (2018.01)

(52) U.S. Cl.
CPC ............ *G06F 13/36* (2013.01); *G06F 9/4405* (2013.01)

(58) Field of Classification Search
CPC ....... G06F 13/36; G06F 9/4401; G06F 9/4405
See application file for complete search history.

(56) References Cited

U.S. PATENT DOCUMENTS

| 10,833,889 B2* | 11/2020 | Menschner | ........ G05B 19/4185 |
| 10,956,352 B2* | 3/2021 | Akbarian | .............. H04L 12/403 |
| 2010/0185784 A1* | 7/2010 | De Nie | ................ G06F 13/4291 710/9 |
| 2012/0066356 A1* | 3/2012 | Nguyen | ............ H04L 12/40169 709/220 |
| 2013/0238200 A1* | 9/2013 | Woodcock | .......... A01M 7/0089 701/50 |
| 2013/0326099 A1* | 12/2013 | Schmidt | .............. H04L 61/2038 710/110 |

(Continued)

FOREIGN PATENT DOCUMENTS

| DE | 102004027893 A1 | 1/2006 |
| DE | 102004060007 A1 | 6/2006 |
| DE | 102008005317 A1 | 7/2009 |

(Continued)

*Primary Examiner* — Henry Tsai
*Assistant Examiner* — Christopher A Daley
(74) *Attorney, Agent, or Firm* — Patrick D. Duplessis (57) ABSTRACT

A method for initializing a bus system for a process plant includes: installing an administrative bus participant and a second bus participant at respective installation sites in the process plant; storing a list of at least two installation sites of bus participants in the administrative bus participant; connecting the administrative bus participant and the second bus participant to each other across a data bus; prompting an identification sensor of the second bus participant with an identification prompt; after detection of the identification prompt by the identification sensor, sending an identification signal identifying the second bus participant to the administrative bus participant; and after receiving the identification signal identifying the second bus participant, matching up the second bus participant with an installation site of the at least two installation sites contained in the stored list.

13 Claims, 3 Drawing Sheets

(56) References Cited

U.S. PATENT DOCUMENTS

2014/0188933 A1    7/2014  Chomik et al.
2015/0222594 A1*   8/2015  Fritsch .................... H04L 67/12
                                                              370/252

FOREIGN PATENT DOCUMENTS

| DE | 102011078030 A1 | 12/2012 |
| DE | 102013220707 A1 | 4/2015 |
| DE | 102017208836 A1 | 11/2018 |

* cited by examiner

FIG. 4d

METHOD FOR INITIALIZING A BUS SYSTEM FOR A PROCESS PLANT, AND THE BUS SYSTEM

TECHNICAL FIELD

The invention relates to a method for initializing a bus system for a process plant, wherein the bus system comprises at least one first bus participant and one second bus participant, wherein the first bus participant and the second bus participant are each installed at an installation site in the process plant, wherein the first bus participant is an administrative bus participant and wherein a list of at least two installation sites of the bus participants is stored in the first bus participant and wherein the first bus participant and the second bus participant are connected to each other across a data bus. Furthermore, the invention relates to a corresponding bus system for a process plant and a corresponding bus participant.

BACKGROUND

Process plants are known in many forms from the prior art, and they are often actuated by bus systems. In the bus system, the individual bus participants of the process plant can communicate with each other via the data bus or the individual bus participants can be actuated, whereby not only is production made easier in many branches of industry, but also the production costs can be lowered. The bus participants are, for example, the field devices of a process plant.

The present invention is not concerned with the type of bus system. Thus, it is not important what topology the bus system has, or what protocol is used for the individual bus participants to communicate with each other. The only thing important is that the bus system has at least one administrative bus participant, the administrative bus participant being characterized as compared to the other bus participant or participants in that it can obtain information about the entire bus system. An administrative bus participant may be a normal bus node, such as a bus master or also a bus slave; but an administrative bus participant may also be a control computer (process control system) connected to the data bus. For this reason, we speak here of an "administrative bus participant", because it does not matter whether or not the administrative bus participant can arbitrate the data bus as a resource.

Typical process plants have a plurality of bus participants, for example hundreds of them, each of which is installed at an installation site in the process plant.

In the bus systems known from the prior art, the administrative bus participant cannot perform any topology identification. This means that it cannot determine at which installation sites the individual bus participants of the bus system are arranged; thus, it cannot match up a bus participant with a particular installation site. However, knowledge of this match-up is essential for a specific actuating and a smooth course of the process. Accordingly, the individual bus participants must be learned at the administrative bus participant.

It is known from the prior art how to perform the learning by a manual matching up. Each of the bus participants has an identification feature clearly identifying it. This may be, for example, a serial number of the bus participant. The serial number of the bus participant is identifiable for example from the nameplate affixed to the bus participant or it can be retrieved from a digital interface of the bus participant. This distinct identification feature of each bus participant makes possible a manual matching up—for example, by a technician who places the process plant in operation—of one bus participant with one installation site. Especially when there is a plurality of bus participants, such as is present in customary process plants, the manual matching up is extremely costly, in particular, it involves a particularly time-consuming process.

SUMMARY

Accordingly, underlying object of the invention is to indicate a method for initializing a bus system and a corresponding bus system with which an easy initializing of the bus system becomes possible.

According to the invention, the object is solved according to a method of initializing such a bus system.

In the following, the description of the method according to the invention will also refer to the bus system according to the invention, since this will facilitate a clear description of the invention. All the remarks made regarding the method according to the invention also apply to the bus system according to the invention and vice versa.

First, the bus system according to the invention is characterized in that at least the second bus participant comprises an identification sensor. Stating that at least the second bus participant comprises an identification sensor, then for example only the second bus participant may comprise an identification sensor; but the first, namely the administrative bus participant may also comprise an identification sensor. Possible configurations of the identification sensor are discussed further below.

Now, the method according to the invention for initializing a bus system is characterized by the following steps:

In a prompting step, the identification sensor of the second bus participant is prompted with an identification prompt.

After the detecting of the identification prompt by the identification sensor, the second bus participant sends an identification signal identifying the second bus participant to the administrative bus participant in a transmitting step.

In a match-up step, the administrative bus participant after receiving the identification signal identifying the second bus participant matches up the second bus participant with an installation site of the installation sites contained in the stored list.

According to the invention, it has been discovered that the method for initializing a bus system can be substantially simplified in that the bus participants themselves send identification signals identifying them to the administrative bus participant. For this, the bus participants only need to be prompted to send the identification signals. Thus, in the method according to the invention, the manual matching up of the bus participants with their particular installation site is no longer necessary, so that the method according to the invention can be employed in an especially time and cost saving manner.

As mentioned, a bus participant which is to be matched up with an installation site needs to be prompted with an identification prompt, namely, the identification sensor of the bus participant needs to be prompted. In order to initialize this identification prompt, it is provided in one embodiment that the bus system comprises a requesting unit. The requesting unit is connected by a communication channel to the administrative bus participant, wherein the communication channel may be a wire line or a wireless communication channel.

According to the invention, the method then has further steps in one embodiment:

In a communicating step, the administrative bus participant communicates to the requesting unit the installation site of the prompting bus participant. Thus, in this embodiment, the administrative bus participant determines at which installation site a bus participant is to be prompted. In particular when the bus system has many bus participants, the administrative bus participant can indicate the sequence of the installation sites where the installed bus participants should be prompted. The sequence here may correspond for example to the sequence of the installation sites saved in the list.

In an alternative embodiment of the method according to the invention, in the communicating step the requesting unit communicates to the administrative bus participant the installation site of the prompting bus participant. In this embodiment, therefore, the administrative bus participant does not determine the installation site at which the next bus participant prompting should occur, but rather the administrative bus participant obtains information as to which installation site is the next one for prompting of a bus participant. The sequence may be established, for example, by the requesting unit. In another embodiment, the requesting unit itself may receive the sequence of installation sites dictated by a third party.

In a requesting step following the communicating step, the requesting unit requests that an identification prompter issue the identification prompt. The identification prompter here may be for example a technician who is initializing the bus system. Alternatively, the identification prompter may also be a bus participant in the bus system, especially a field device of the process plant, issuing the identification prompt.

In a further embodiment, at least one third bus participant is provided in the bus system, the third bus participant being installed at an installation site in the process plant and likewise comprising an identification sensor. The third bus participant is arranged in such a spatial arrangement to the second bus participant that an intentional identification prompt of the identification sensor of the second bus participant also results in an unintentional identification prompt of the identification sensor of the third bus participant. Accordingly, both the second bus participant and the third bus participant each send out an identification signal to the administrative bus participant. Furthermore, it is provided that the identification signal has a signal component characterizing the identification prompt.

In another embodiment of the method according to the invention, it is accordingly provided that in a comparing step the administrative bus participant after receiving the two identification signals compares the signal components of the identification signals characterizing the identification prompt with each other and identifies the intentionally prompted bus participant by means of the comparison. In a match-up step following the comparing step, the administrative bus participant matches up the intentionally prompted bus participant with an installation site of the installation sites saved in the list.

This embodiment of the method according to the invention can prevent wrong match-up of a bus participant with the wrong installation site, as a result of said participant being accidentally prompted by an identification prompt of a neighboring bus participant. Such an unintentional prompting cannot be prevented when the bus participants are arranged at very closely spaced installation sites and/or when the identification prompt is not locally limited. The situation will be explained in the following with the aid of an example—yet not limiting the invention. If, for example, the identification sensor is designed as a Hall sensor and accordingly it measures a magnetic field, the identification prompt occurs in that the identification sensor is subjected to a magnetic field. The magnetic field is generated by a magnetic field generating device, such as a permanent magnet. In order to prompt the identification sensor, the magnetic field generating device and the bus participant are brought spatially close together, so that the magnetic field passes through the identification sensor. Now, if another bus participant is placed close to the second bus participant, with another identification sensor realized as a Hall sensor, such that the magnetic field also passes at least partially through the Hall sensor of the other bus participant, said participant will likewise be prompted to put out an identification signal identifying it.

Besides the method for initializing a bus system, the invention likewise relates to a bus system for a process plant. The bus system comprises at least one first bus participant and at least one second bus participant, wherein the first bus participant and the second bus participant are each installed at an installation site in the process plant. The first bus participant is an administrative bus participant, while a list of at least two installation sites of the bus participants is stored in the first bus participant. Furthermore, the first bus participant and the second bus participant are connected to each other across a data bus.

The object is solved for the bus system at first and essentially in that at least the second bus participant has an identification sensor, the second bus participant being configured such that, after detecting an identification prompt via the identification sensor, it sends an identification signal identifying the second bus participant to the administrative bus participant. Moreover, the administrative bus participant is configured such that, after receiving the identification signal identifying the second bus participant, it carries out a matching up of the second bus participant with an installation site of the installation sites contained in the stored list.

In an especially preferred embodiment, a requesting unit is provided, being connected across a communication channel to the administrative bus participant. The communication channel here may be a wireless communication channel or a wire line communication channel. The identification prompter may be a user, for example, especially a technician, who is placing the process plant with the bus system according to the invention in operation. However, the identification prompter may also be realized, for example, by a field device of the process plant. The requesting unit is configured such that it requests an identification prompter to issue the identification prompt.

In an especially preferred embodiment of the bus system according to the invention, the requesting unit is configured such that it communicates to the administrative bus participant the installation site of the prompting bus participant. Thus, in this embodiment, the administrative bus participant is informed as to the site where the installed bus participant should be prompted.

In an alternative embodiment, the administrative bus participant is configured such that it communicates to the requesting unit the installation site of the prompting bus participant. Accordingly, the administrative bus participant communicates to the requesting unit that a request should be made to issue an identification prompt of the bus participant at the installation site—especially the one determined by the administrative bus participant.

Especially preferably, the administrative bus participant establishes the sequence of the installation sites at which the bus participants installed there should be prompted—preferably in succession.

The identification sensors according to the invention can be realized in various ways. Especially preferable is the identification sensor of a bus participant as an inductive sensor, a capacitive sensor, an acceleration sensor, a Hall sensor, an infrared sensor or a key. This list is not exhaustive; instead, any other embodiment of the identification sensor is included in the invention.

The nature of the identification prompt depends on the configuration of the identification sensor.

For example, if the identification sensor is configured as an acceleration sensor, the identification prompt will then be realized by a movement, such as a vibration, of the bus participant. This may be realized for example by the technician knocking against the bus participant.

If the identification sensor is configured as a Hall sensor, the identification prompt may then be realized for example in that a magnetic field source, such as a permanent magnet, is held on the bus participant. In an alternative configuration, a magnetic field source is firmly installed in the process plant and the bus participant is brought into proximity of the magnetic field source.

If the identification sensor is configured as an infrared sensor, the identification prompt preferably occurs by coupling in an infrared signal which is put out by an infrared transmitter.

If the identification sensor is configured as a key, the identification prompt is realized by pressing the key. In this way, a current in the bus participant can be opened or closed, for example.

In an embodiment in which multiple bus participants are provided, each with an identification sensor, the identification sensors of the individual bus participants are identical in design. In a further embodiment in which multiple bus participants are provided, each with an identification sensor, the identification sensors of the individual bus participants are realized in different ways. In a further embodiment in which multiple bus participants are provided, each with an identification sensor, some of the identification sensors are identical and others are different in design.

In another preferred embodiment of the bus system according to the invention, it is provided that at least one third bus participant is installed at an installation site in the process plant. The third bus participant comprises an identification sensor and is arranged in such a spatial arrangement to the second bus participant that an intentional identification prompt of the identification sensor of the second bus participant also results in an unintentional identification prompt of the identification sensor of the third bus participant. Both bus participants then send out an identification signal to the administrative bus participant.

The administrative bus participant accordingly receives two identification signals, but only one bus participant can or should be matched up with the installation site.

According to the invention, it is further provided that the identification signal has a signal component characterizing the identification prompt. Moreover, the administrative bus participant is configured such that, after receiving the two identification signals, it compares the signal components of the identification signals characterizing the identification prompt with each other and infers the intentionally prompted bus participant by means of the comparison and matches up this bus participant with an installation site. Thus, a distinct match-up of a single bus participant with an installation site is assured.

In an especially preferred embodiment, the administrative bus participant is designed such that it compares the signal amplitudes of the signal components characterizing the identification prompt with each other. In this case, the signal amplitude of the intentionally prompted bus participant is greater than the signal amplitude of the unintentionally prompted bus participant.

Besides the bus system, the invention further relates to a bus participant for a bus system. For the bus participant according to the invention, the object underlying the invention is solved in that the bus participant comprises an identification sensor and is configured such that, after receiving an identification prompt, it can send an identification signal identifying the bus participant.

The bus participant according to the invention is preferably realized according to at least one feature characterizing the bus participant, embodied in accordance with the bus system according to the invention. Accordingly, all the remarks made in connection with the bus system in regard to the bus participant apply to the bus participant according to the invention.

The above described methods are also suitable for making possible a position identification of individual bus participants in ongoing operation, besides the initializing of the bus system according to the invention.

The method according to the invention is likewise suitable for facilitating a replacement of a field device in a process plant. The newly installed field device can then be initialized in the manner of the invention.

BRIEF DESCRIPTION OF THE DRAWINGS

Specifically, there are many possibilities of designing and modifying the method according to the invention, the bus system according to the invention, and the bus participant according to the invention. For this, reference is made to the description of exemplary embodiments in connection with the drawings.

DETAILED DESCRIPTION

Figure 1:
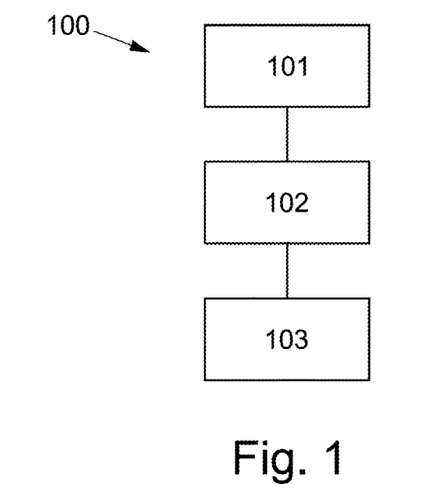
FIG. 1 illustrates a block diagram of a first embodiment of a method for initializing a bus system.

FIG. 1 shows a block diagram of a method 100 for initializing a bus system 1 for a process plant 2. A schematic representation of the bus system 1 initialized with the method presented in FIG. 1 is shown in FIG. 3.

Figure 3:
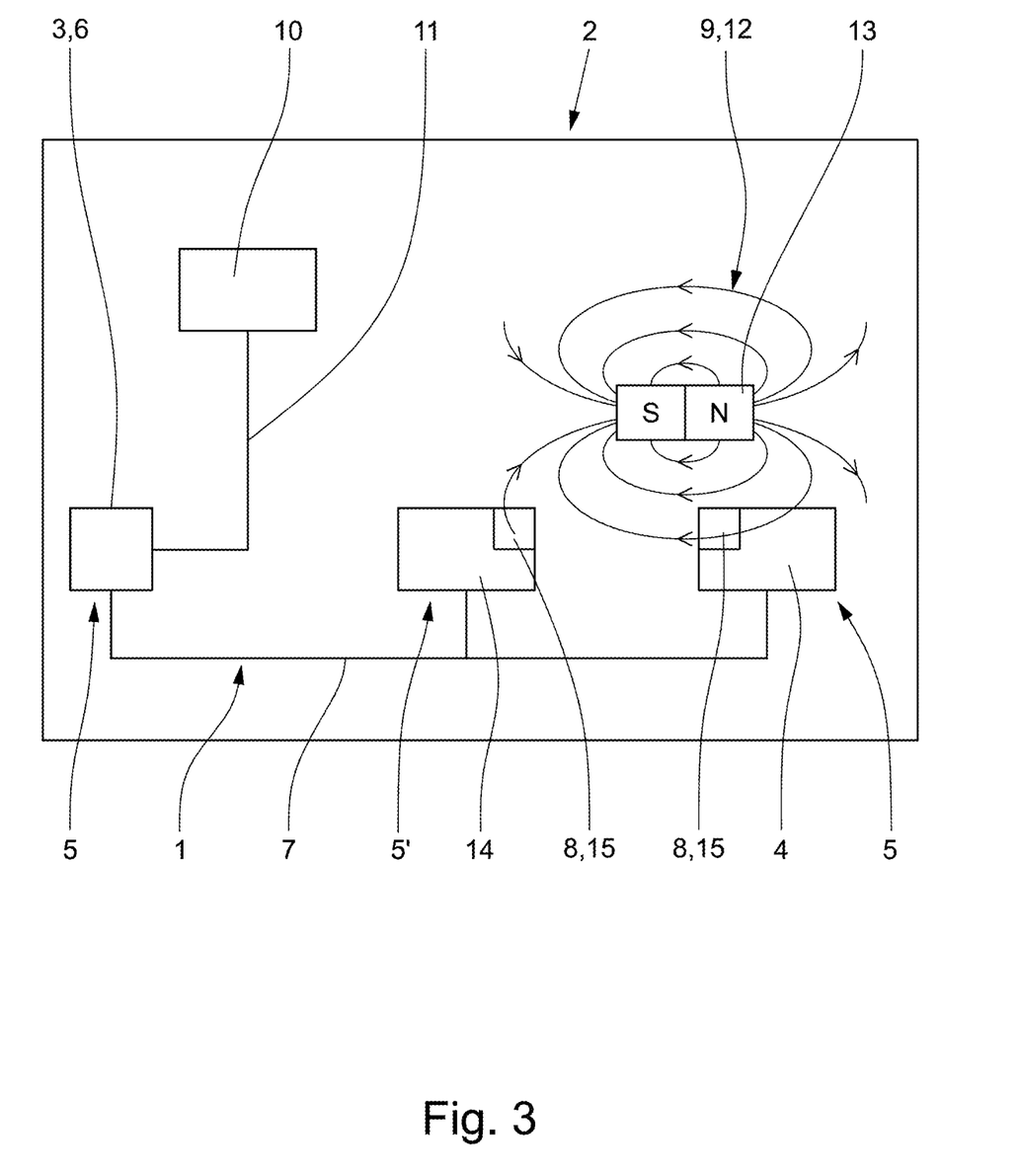
FIG. 3 illustrates a process plant with a bus system.

The bus system represented in FIG. 3 is installed in a process plant 2, the process plant 2 in the exemplary embodiment shown being configured as a bottling plant for the filling of fluid media in containers. However, the representation of the process plant 2 as a bottling plant should not limit the invention. Instead, the bus system 1 can be installed in any given process plant 2.

The bus system 1 comprises a first bus participant 3 and a second bus participant 4, the first bus participant 3 and the second bus participant 4 each being installed at an installation site 5 in the process plant 2. The first bus participant 3 is realized as an administrative bus participant 6; a list of at least two installation sites 5 of the bus participants 3, 4 being stored in the first bus participant 3. Furthermore, the first bus participant 3 and the second bus participant 4 are connected to each other by a data bus 7. The second bus participant 4 comprises an identification sensor 8.

The method 100 represented in FIG. 1 is now characterized in that, at first, in a prompting step 101, the identification sensor 8 of the second bus participant 4 is prompted with an identification prompt 9. After the detecting of the identification prompt 9 by the identification sensor 8 of the second bus participant 4, the second bus participant 4 sends in a transmitting step 102 an identification signal identifying it to the administrative bus participant 6. In a match-up step 103, the administrative bus participant 6, after receiving the identification signal identifying the second bus participant 4, undertakes a matching up of the second bus participant 4 with an installation site 5 of the installation sites 5 contained in the stored list. The method shown enables an initializing of the bus system 1 in very time-saving and elegant manner, since a manual matching up of the individual bus participants 3, 4 with the installation sites 5 of the process plant 2 is not needed.

Furthermore, as can be seen in FIG. 3, a requesting unit 10 is provided, which is connected across a communication channel 11 to the administrative bus participant 6. In the exemplary embodiment shown, the requesting unit 10 is realized as a display. The administrative bus participant 6 in the exemplary embodiment shown is designed such that it communicates to the requesting unit 10 the installation site 5 of the prompting bus participant 4. Accordingly, the installation site 5 of the prompting bus participant 4 is pictured on the display and is visible for example to a technician who is initializing the bus system. Furthermore, the requesting unit 10 is configured such that it requests an identification prompter 11, namely, the technician in the present instance, to issue the identification prompt 9. In the present example, this can be realized in that the requesting unit 10 produces a signal tone, and moreover visually signals the installation site 5 of the next bus participant 4 to be prompted.

In the exemplary embodiment of the bottling plant represented in FIG. 3, the identification sensor 8 of the second bus participant 4 is configured as a Hall sensor 15. The identification prompt 9 occurs accordingly in that the identification sensor 8 is subjected to a magnetic field. The magnetic field 12 is generated by means of a permanent magnet 13, which is placed in the vicinity of the second bus participant 4. FIG. 3 shows schematically the permanent magnet 13 with the magnetic field 12.

The process plant 2 comprises, besides the second bus participant 4, a third bus participant 14, which likewise comprises an identification sensor 8 configured as a Hall sensor 12 and being arranged spatially near the second bus participant 4. As shown schematically, an identification prompt 9 of the identification sensor 8 of the second bus participant 4 by means of the magnetic field 12 likewise results in an identification prompt 9 of the identification sensor 8 of the third bus participant 14, since the magnetic field 12 also passes through the third bus participant 14, especially the identification sensor 8 of the third bus participant 14. The third bus participant 14 is designed identical to the second bus participant 4, and accordingly it is realized such that, after prompting of the identification sensor 8, it sends an identification signal to the administrative bus participant 6. Accordingly, in the present case, both the second bus participant 4 and the third bus participant 14 send an identification signal to the administrative bus participant 6.

The identification signal has a signal component characterizing the identification prompt 9. The administrative bus participant 6 is accordingly configured such that, after receiving the two identification signals, it compares the signal components of the identification signals characterizing the identification prompt 9 with each other, and infers the bus participant 4, 14 that was intentionally prompted, i.e., the one pertaining to the identification prompt 9, by means of the comparison of the signal components. This bus participant, in the present case the bus participant 4, is then matched up by the administrative bus participant 6 with an installation site 5. In the present case, the administrative bus participant 6 compares the signal amplitudes of the signal components characterizing the identification prompt. By means of such a configuration, it is possible to prevent a wrong match-up of a bus participant 4, 14 with an installation site 5 when the latter sends out an identification signal unintentionally, namely, due to the identification prompt 9 of a neighboring bus participant 4.

Figure 2:
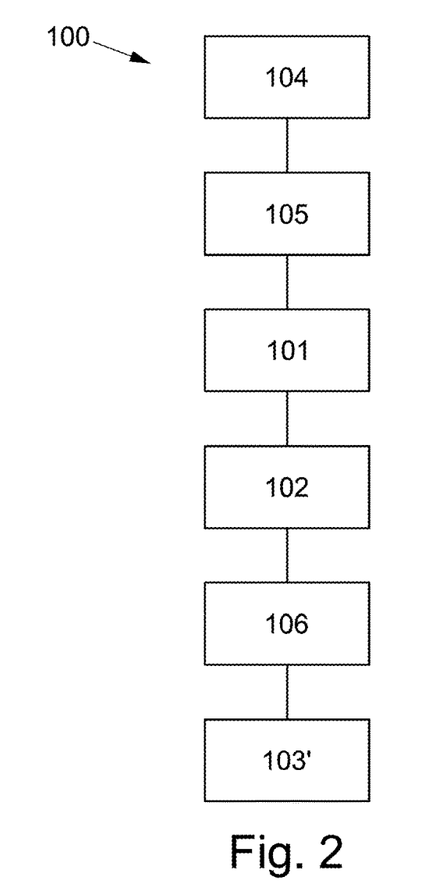
FIG. 2 illustrates a block diagram of a second embodiment of a method for initializing a bus system.

FIG. 2 shows another method 100, having further steps as compared to the method 100 represented in FIG. 1. In a communicating step 104, the administrative bus participant 6 communicates to the requesting unit 10 the installation site 5 of the prompting bus participant 4. In a subsequent requesting step 105, the requesting unit 10 asks an identification prompter 11 to issue the identification prompt 9. The identification prompter 11 complies with this request. Accordingly, in a prompting step 101 the identification sensor 8 of the second bus participant 4 is prompted with an identification prompt 9. In a subsequent transmitting step 102, the second bus participant 4 after detecting the identification prompt 9, by the identification sensor 8 sends an identification signal identifying the second bus participant 4 to the administrative bus participant 6. In the prompting step 101, in the present case, an identification sensor 8 of a third bus participant 14 is unintentionally prompted, whereupon it sends out in the transmitting step 102 an identification signal identifying the third bus participant to the administrative bus participant 6. The administrative bus participant 6 thus receives two identification signals from two different bus participants 4, 14. The two identification signals each have a signal component characterizing the identification prompt 9. In a comparing step 106, the administrative bus participant 6, after receiving the two identification signals, compares the signal components of the identification signals characterizing the identification prompt 9 with each other and identifies the intentionally prompted bus participant, in the present instance bus participant 4, by means of the comparison of the signal components. In a match-up step 103', this bus participant is matched up with an installation site 5.

FIGS. 4a-4d shows different bus participants 4 with different identification sensors 8. Furthermore, FIGS. 4a-4d shows the respective identification prompt 9, attuned to the nature of the identification sensor 8.

Figure 4A:
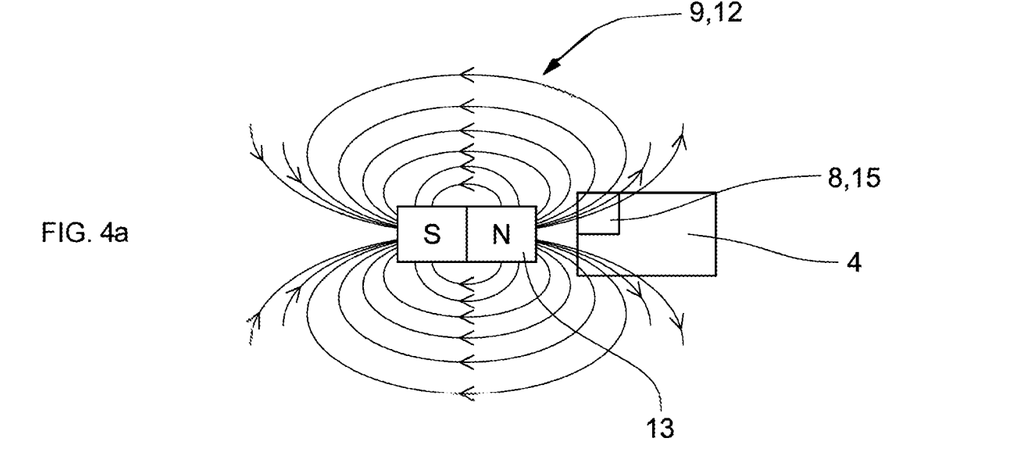
FIGS. 4a-4d illustrate various configurations of the identification sensor and the identification prompt.

FIG. 4a shows a bus participant 4 with an identification sensor 8 configured as a Hall sensor 15. The identification prompt 9 here occurs by means of a magnetic field 12, which is generated by a permanent magnet 13. The permanent magnet 13 is placed in proximity to the bus participant 4, so that the identification sensor 8, namely the Hall sensor 15, is subjected to the magnetic field 12.

Figure 4B:
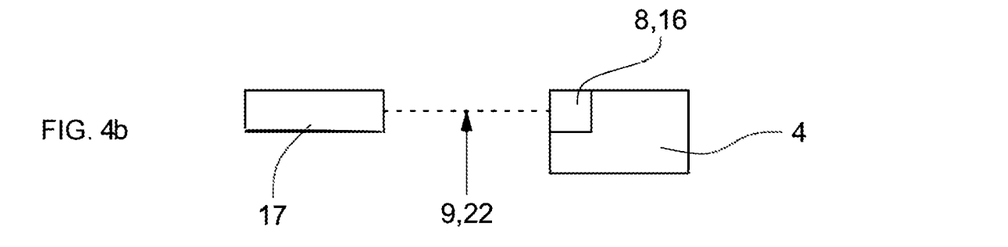

In FIG. 4b, a bus participant 4 is shown with an identification sensor 8 configured as an infrared sensor 16. The identification prompt 9 occurs by an infrared signal 22, which is sent out by the infrared sensor 17.

Figure 4C:
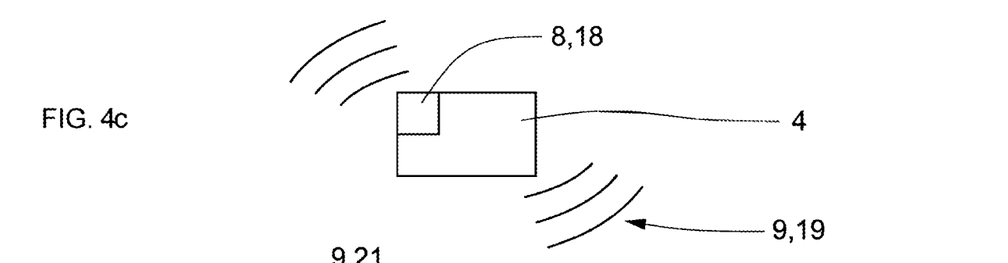

In FIG. 4c, a bus participant 4 is shown with an identification sensor 8 realized as an acceleration sensor 18, namely, as a capacitive acceleration sensor 18. The identification prompt 9 here occurs by a vibration 19 of the bus participant 4, especially the acceleration sensor 18. The vibration 19 can be realized, for example, by a technician knocking or pushing against the bus participant 4.

Figure 4D:
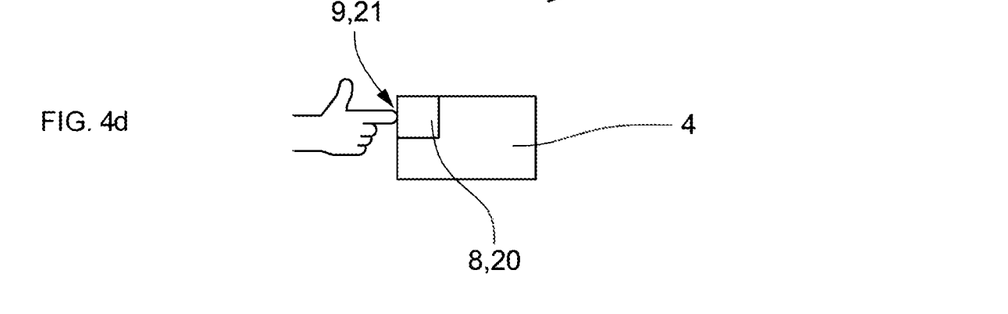

FIG. 4d shows another configuration in which the bus participant 4 has an identification sensor 8 designed as a key. The identification prompt 9 here occurs by key pressing 21. The hand of a technician performing the key pressing 21 is shown.

The invention claimed is:

1. A method for initializing a bus system for a process plant, wherein the bus system comprises at least an administrative bus participant and a second bus participant, the method comprising:
   installing the administrative bus participant and the second bus participant at respective installation sites in the process plant;
   storing a list of at least two installation sites of bus participants in the administrative bus participant;
   connecting the administrative bus participant and the second bus participant to each other across a data bus;
   prompting an identification sensor of the second bus participant with an identification prompt;
   after detection of the identification prompt by the identification sensor, and as a result of the detection of the identification prompt by the identification sensor, sending an identification signal identifying the second bus participant to the administrative bus participant; and
   after receiving the identification signal identifying the second bus participant, matching up the second bus participant with an installation site of the at least two installation sites contained in the stored list.

2. The method of claim 1, further comprising connecting a requesting unit across a communication channel to the administrative bus participant;
   communicating from the administrative bus participant to the requesting unit the installation site of the second bus participant; and
   using the requesting unit to request that an identification prompter issue the identification prompt.

3. The method of claim 2, further comprising:
   installing a third bus participant at an installation site in the process plant;
   spatially arranging the third bus participant relative to the second bus participant such that an intentional identification prompt of the identification sensor of the second bus participant also results in an unintentional identification prompt of an identification sensor of the third bus participant, such that the second bus participant and the third bus participant each send out an identification signal having a signal component characterizing the identification prompt;
   after receiving the two identification signals, using the administrative bus participant to compare the signal components of the identification signals characterizing the identification prompt with each other, and to identify the intentionally prompted bus participant by means of the comparison, and to match up this bus participant with an installation site of the at least two installation sites contained in the stored list.

4. The method of claim 1, further comprising connecting a requesting unit across a communication channel to the administrative bus participant;
   communicating from the requesting unit to the administrative bus participant the installation site of the second bus participant; and
   using the requesting unit to request that an identification prompter issue the identification prompt.

5. The method of claim 4, further comprising:
   installing a third bus participant at an installation site in the process plant;
   spatially arranging the third bus participant relative to the second bus participant such that an intentional identification prompt of the identification sensor of the second bus participant also results in an unintentional identification prompt of an identification sensor of the third bus participant, such that the second bus participant and the third bus participant each send out an identification signal having a signal component characterizing the identification prompt;
   after receiving the two identification signals, using the administrative bus participant to compare the signal components of the identification signals characterizing the identification prompt with each other, and to identify the intentionally prompted bus participant by means of the comparison, and to match up this bus participant with an installation site of the at least two installation sites contained in the stored list.

6. A bus system for a process plant, comprising:
   an administrative bus participant and a second bus participant installed at respective installation sites in the process plant and connected to each other across a data bus;
   a list of at least two installation sites of bus participants stored in the administrative bus participant;
   wherein the second bus participant has an identification sensor;
   wherein the second bus participant is configured such that, after detecting an identification prompt via the identification sensor, and as a result of the detection of the identification prompt by the identification sensor, the second bus participant sends an identification signal identifying the second bus participant to the administrative bus participant; and
   wherein the administrative bus participant is configured such that, after receiving the identification signal identifying the second bus participant, the administrative bus participant matches up the second bus participant with an installation site of the at least two installation sites contained in the stored list.

7. The bus system of claim 6, further comprising a requesting unit connected across a communication channel to the administrative bus participant, wherein the requesting unit is configured to request an identification prompter to put out the identification prompt.

8. The bus system of claim 7, wherein the requesting unit is configured to communicate to the administrative bus participant the installation site of the second bus participant.

9. The bus system of claim 7, wherein the administrative bus participant is configured to communicate to the requesting unit the installation site of the second bus participant.

10. The bus system of claim 6, wherein the identification sensor is configured as an inductive sensor, a capacitive sensor, a Hall sensor, an infrared sensor, an acceleration sensor, or a key.

11. The bus system of claim 6, further comprising a third bus participant installed at an installation site in the process plant, the third bus participant including an identification sensor;
  wherein the third bus participant stands in such a spatial arrangement to the second bus participant that an intentional identification prompt of the identification sensor of the second bus participant also results in an unintentional identification prompt of the identification sensor of the third bus participant, such that both bus participants send out an identification signal to the administrative bus participant;
  wherein the identification signal includes a signal component characterizing the identification prompt; and
  wherein the administrative bus participant is configured such that, after receiving the two identification signals, the administrative bus participant compares the signal components of the identification signals characterizing the identification prompt with each other and identifies the intentionally prompted bus participant by means of the comparison and matches up the intentionally prompted bus participant with an installation site of the at least two installation sites contained in the stored list.

12. A bus participant for a bus system, wherein the bus participant is connectible by a data bus to at least one second bus participant; and
  wherein the bus participant comprises an identification sensor and is configured such that, after receiving an identification prompt, and as a result of the detection of the identification prompt by the identification sensor, the bus participant can send an identification signal identifying the bus participant.

13. The bus participant according to claim 12, wherein the bus participant is an administrative bus that stores a list of at least two installation sites of bus participants; and
  wherein the bus participant is configured to match up the at least one second bus participant with an installation site of the at least two installation sites contained in the stored list.

* * * * *